US011687858B2

(12) United States Patent
Rentz et al.

(10) Patent No.: US 11,687,858 B2
(45) Date of Patent: Jun. 27, 2023

(54) PRIORITIZING TRIM REQUESTS OF VEGETATION USING MACHINE LEARNING

(71) Applicant: Florida Power & Light Company, Juno Beach, FL (US)

(72) Inventors: Iliana M. Rentz, West Palm Beach, FL (US); Jeffrey D Dubs, Jupiter, FL (US); Roberto J Rivera, Jupiter, FL (US); Corinne E Murray, West Palm Beach, FL (US); Steve T Jolly, Palm Beach Gardens, FL (US)

(73) Assignee: FLORIDA POWER & LIGHT COMPANY, Juno Beach, FL (US)

( * ) Notice: Subject to any disclaimer, the term of this patent is extended or adjusted under 35 U.S.C. 154(b) by 204 days.

(21) Appl. No.: 16/984,694

(22) Filed: Aug. 4, 2020

(65) Prior Publication Data
US 2022/0044167 A1 Feb. 10, 2022

(51) Int. Cl.
*G06Q 10/0633* (2023.01)
*G06Q 50/10* (2012.01)
(Continued)

(52) U.S. Cl.
CPC ......... *G06Q 10/0633* (2013.01); *G06N 20/00* (2019.01); *G06Q 50/10* (2013.01);
(Continued)

(58) Field of Classification Search
CPC .... G06Q 10/0633; G06Q 50/10; G06N 20/00; G06V 20/188; H04L 51/04; H04L 51/10; H04L 51/226; A01G 3/08; A01G 3/00
See application file for complete search history.

(56) References Cited

U.S. PATENT DOCUMENTS 9,527,115 B2 * 12/2016 LaRose ............... B07C 5/342
9,784,836 B2 * 10/2017 Heinonen ............ G01S 17/89
(Continued)

FOREIGN PATENT DOCUMENTS

WO WO-2021092394 A1 * 5/2021 ......... G06K 9/00657

OTHER PUBLICATIONS

Chan, et al. "Defining a conceptual framework for the integration of modelling and advanced imaging for improving the reliability and efficiency of bridge assessments" 2016.
(Continued)

*Primary Examiner* — Dylan C White
(74) *Attorney, Agent, or Firm* — Tarolli, Sundheim, Covell & Tummino LLP

(57) ABSTRACT

A system for prioritizing trim requests can include an image processor that identifies a location associated with a customer trim request that includes an image of vegetation and industrial equipment and marks the vegetation and the industrial equipment visible in the image associated with the customer trim request. The system can also include a vegetation maintenance analyzer that searches for a match between the identified location associated with the customer trim request with a location associated with one of a past executed service ticket and a pending service ticket. The maintenance analyzer generates a maintenance profile for the customer trim request based on the results of the search and data in the customer trim request. The system can further include a priority engine that assigns priority to the customer trim request based on the maintenance profile for the customer trim request.

19 Claims, 6 Drawing Sheets

(51) Int. Cl.
  *G06V 20/10* (2022.01)
  *H04L 51/04* (2022.01)
  *G06N 20/00* (2019.01)
  *A01G 3/08* (2006.01)

(52) U.S. Cl.
  CPC ............ *G06V 20/188* (2022.01); *H04L 51/04* (2013.01); *A01G 3/08* (2013.01)

(56) References Cited

U.S. PATENT DOCUMENTS

| | | | |
|---|---|---|---|
| 10,032,267 B2* | 7/2018 | Strebel | G01S 7/4802 |
| 10,880,623 B2* | 12/2020 | Saha | H04Q 9/00 |
| 11,475,385 B2* | 10/2022 | Saha | B64C 39/024 |
| 11,527,025 B2* | 12/2022 | Abi-Rached | G06Q 10/06312 |
| 2018/0098137 A1* | 4/2018 | Saha | G06Q 10/20 |
| 2020/0235559 A1* | 7/2020 | Neuenschwander | H02G 7/00 |
| 2020/0394725 A1* | 12/2020 | Bharti | G06Q 10/06316 |
| 2021/0073692 A1* | 3/2021 | Saha | G06V 10/764 |
| 2021/0142537 A1* | 5/2021 | Abi-Rached | G06Q 10/06315 |
| 2021/0158237 A1* | 5/2021 | Atwater | G06V 20/188 |
| 2021/0192629 A1* | 6/2021 | Tofte | G06T 17/05 |
| 2022/0108242 A1* | 4/2022 | Saha | G06T 7/0004 |

OTHER PUBLICATIONS

Xu, et al. "Risk assessment for wildfire occurrence in highvoltage power line corridors by using remote sensing techniques: a case study in Hubei Province, China" International Journal of Remote Sensing, 37:20, 4818-4837, DOI: 10.1080/01431161.2016.1220032, 2016.

Nguyen, et al., "Automatic Autonomous Vision-based Power Line Inspection: a Review of Current Status and the Potential Role of Deep Learning" UIT Machine Learning Group, Faculty of Science and Technology, Department of Physics and Technology, University of Tromsø, 9019 Tromsø, Norway, Analytics Department, eSmart Systems, 1783 Halden, Norway, 2018.

Matikainen, et al. "Remote sensing methods for power line corridor surveys" ISPRS Journal of Photogrammetry and Remote Sensing 119 (2016) 10-31.

* cited by examiner

PRIORITIZING TRIM REQUESTS OF VEGETATION USING MACHINE LEARNING

TECHNICAL FIELD

The present disclosure relates to systems and methods for managing trim requests for vegetation to avoid interfering with power distribution systems.

BACKGROUND

A trim request is a request for a trimming of vegetation. In the context of power distribution systems, trim requests can be issued to avoid and/or remedy vegetation interfering with power distribution equipment (e.g., transmission lines, transformers, feeders, disconnect switches, etc.). A type of trim request, namely customer trim requests can be initiated by people that are at or near premises that receive electrical power from the power distribution system, which premises can be referred to as customer premises. In some examples, the customer trim requests can be made orally (e.g., via telephone) or through an electronic form.

In some examples, customer trim requests are initiated by individuals that witness vegetation potentially or actually interfering with the power distribution equipment. In such a situation, a vegetation maintenance crew (or other service crew) can be deployed to inspect and/or trim vegetation in the region associated with the customer trim request.

SUMMARY

One example relates to a system for prioritizing trim requests that includes an image processor, executing on one or more computing platforms. The image processor can identify a location associated with a customer trim request that includes an image of vegetation and industrial equipment and mark the vegetation and the industrial equipment visible in the image associated with the customer trim request. The system can also include a vegetation maintenance analyzer executing on the one or more computing platforms that can search for a match between the identified location associated with the customer trim request with a location associated with one of a past executed service ticket and a pending service ticket and generate a maintenance profile for the customer trim request based on the results of the search and data in the customer trim request. The system can further include a priority engine executing on the one or more computing platforms that can assign priority to the customer trim request based on the maintenance profile for the customer trim request. The priority engine can also provide the customer trim request and the assigned priority for the customer trim request to a scheduling service to schedule deployment of a service crew to execute a service ticket for the customer trim request in response to the priority assigned to the customer trim request meeting or exceeding a priority threshold level.

Another example relates to a system for prioritizing trim requests. The system can include an image processor, executing on one or more computing platforms. The image processor can receive a customer trim request generated on a remote computing platform via a network. The customer trim request can include an image containing vegetation and industrial equipment, and the image has an embedded geo-tag identifying a location. The image processor can also mark the vegetation and the industrial equipment contained in the image associated with the customer trim request. The system also includes a vegetation maintenance analyzer executing on the one or more computing platforms that searches for a match between the location embedded in the image associated with the customer trim request with a location associated with one of a past executed service ticket and a pending service ticket. The vegetation management analyzer also generates a maintenance profile for the customer trim request based on the results of the search and data in the customer trim request. The system can further include a priority engine executing on the one or more computing platforms that assigns a priority to the customer trim request based on the maintenance profile for the customer trim request and provides a notification to the remote computing platform based on the assigned priority of the customer trim request.

Yet another example relates to a method for prioritizing trim requests. The method can include marking, by a vegetation artificial intelligence (AI) engine executing on one or more computing platforms, vegetation and industrial equipment contained in the image associated with a customer trim request generated by a remote computing platform. The method can also include identifying, by the vegetation AI engine, a location associated with the customer trim request and searching, by the vegetation AI engine, for a match between the identified location associated with the customer trim request with a location associated with one of a past executed service ticket and a pending service ticket. The method can further include generating, by the vegetation AI engine, a maintenance profile for the customer trim request based on the results of the search and data in the customer trim request. The method can still further include assigning, by the vegetation AI engine, a priority to the customer trim request based on the maintenance profile for the customer trim request and providing, by the vegetation AI engine, a notification to the remote computing platform based on the assigned priority of the customer trim request.

DETAILED DESCRIPTION

This disclosure relates to a system that generates a service ticket (e.g., a work order) in response to receiving a customer trim request from a mobile device. The customer trim request can include an image captured by the mobile device that displays vegetation and industrial equipment (e.g., a transmission line, a feeder and/or a transformer). In particular, the system includes a vegetation artificial intelligence (AI) engine that employs machine learning on the received image to determine a location and type of industrial equipment that may be damaged. Additionally, a species of the vegetation can be identified, for example, based on information included in the customer trim request or from another source. The AI engine generates the maintenance profile for the customer trim request based on a predicted growth rate for the identified vegetation and assigns a priority to the customer trim request based on the maintenance profile. The AI engine can forward the customer trim request, along with the maintenance profile and the assigned priority to a scheduling system that can generate a service ticket (e.g., work order) for the customer trim request based on the assigned priority.

Figure 1:
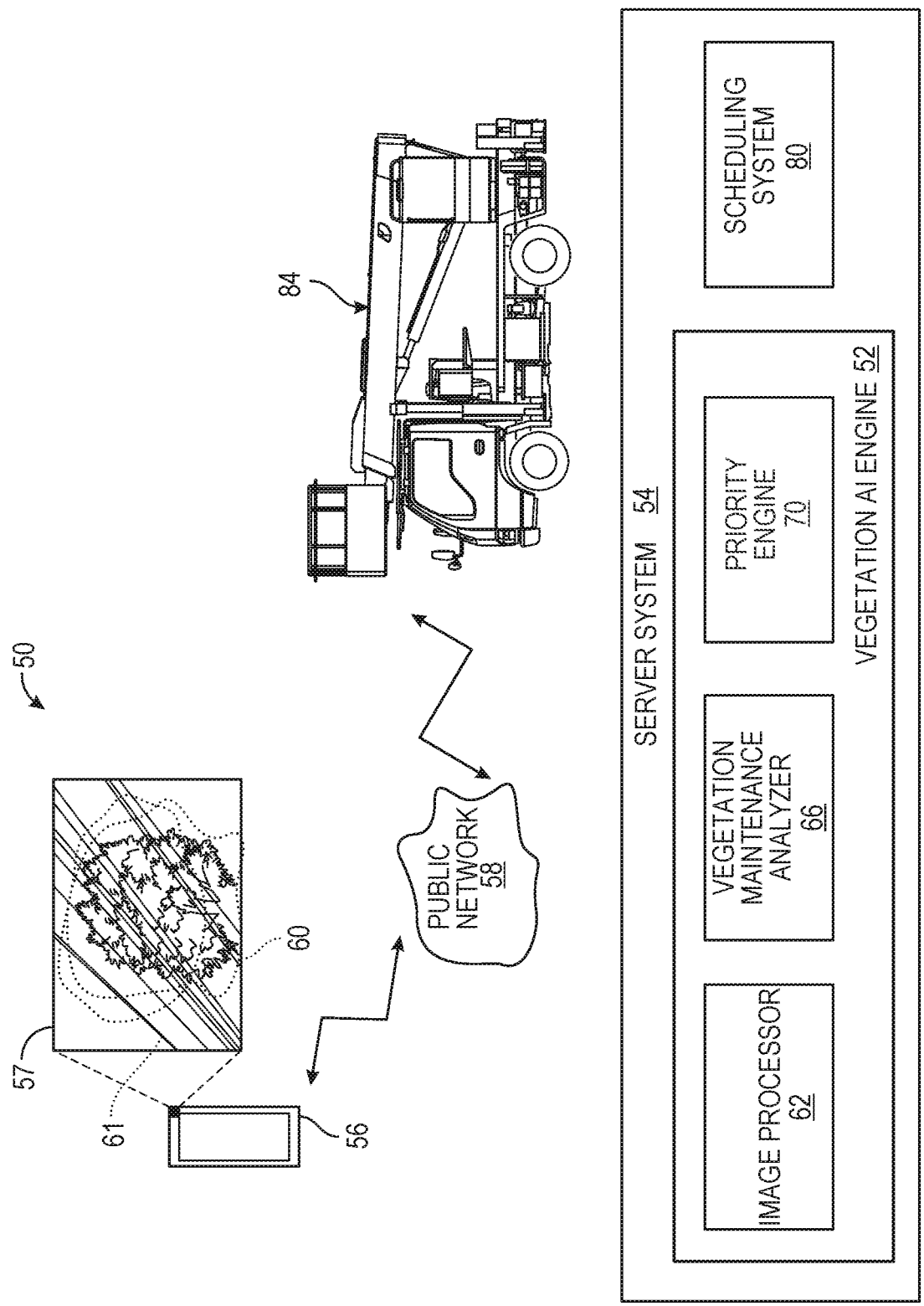
FIG. 1 illustrates a block diagram of an example of a vegetation management system for managing trim requests.

FIG. 1 illustrates a block diagram of a vegetation management system 50 that is employable to manage and/or generate trim requests for a power distribution system (e.g., an electrical power distribution system). The vegetation management system 50 includes a vegetation AI engine 52 executing on a server system 54 that can be implemented as one or more computing platforms. The vegetation AI engine 52 can receive a customer trim request that includes an image 57 captured on a camera of a mobile device 56 and transmitted through a public network 58 (e.g., the Internet) that includes a type of vegetation 60 and a type of industrial equipment 61 of a respective plurality of vegetation types and industrial equipment types. For example, the plurality of vegetation types include palm trees, bamboo, bushes, vines, evergreen trees and deciduous trees. The plurality of types of industrial equipment includes power lines, transformers, feeders and fuse cutouts.

The vegetation AI engine 52 includes machine learning models trained with historical data that includes the plurality of vegetation types and the plurality of industrial equipment types. Accordingly, the vegetation AI engine 52 can include an image processor 62 that can perform object detection on the image 57 and marks the vegetation 60 and the industrial equipment visible in the image 57 associated with the customer trim request. Additionally, the image processor 62 can identify a location associated with the customer trim request based on metadata embedded (e.g., as a geotag) in the image 57 of the customer trim request.

Additionally, the vegetation AI engine 52 can include a vegetation maintenance analyzer 66 that searches for a match between the identified location associated with the customer trim request with a location associated with one of a past executed service ticket and a pending service ticket for vegetation maintenance. The vegetation maintenance analyzer 66 can generate a maintenance profile for the customer trim request based on the results of the search and data in the customer trim request. The maintenance profile can include, for example a predicted growth rate for the vegetation 60 identified in the image 57 to predict a date that the vegetation 60 will interfere with the identified industrial equipment 61.

The vegetation AI engine 52 can also include a priority engine 70 that assigns priority to the customer trim request based on the maintenance profile for the customer trim request. Additionally, the priority engine 70 can provide the customer trim request and the assigned priority for the customer trim request to a scheduling system 80 to schedule deployment of a service crew 84 to execute a service ticket for vegetation maintenance for the customer trim request if the priority assigned to the customer trim request meets or exceeds a priority threshold level. The scheduling system 80 can be implemented on the server system 54, as illustrated or on another computing platform.

In some examples, the priority engine 70 can provide a notification to the mobile device 56. The notification (e.g., a push message, an email or a short message service (SMS) message) can provide an indication of when/if the service crew 84 will be dispatched to inspect and/or remedy the situation characterized in the customer trim request. Additionally, the notification can include information characterizing the assigned priority of the customer trim request.

Furthermore, in some examples, the vegetation maintenance analyzer 66 and the priority engine 70 can operate in concert to generate trim requests (e.g., non-customer generated trim requests). In particular, the vegetation maintenance analyzer 66 can analyze past execute service tickets to identify maintenance patterns. For instance, if the vegetation maintenance analyzer 66 identifies a pattern of service tickets issued for the same area over a certain period of time (e.g., 1-10 year time span), the maintenance analyzer 66 can generate a trim request and a maintenance profile for the trim request based on a predicted pattern. In this situation, the priority engine 70 can assign a priority to the generated trim request and provide the generated trim request, the maintenance profile and the assigned priority to the scheduling system 80 if the assigned priority meets or exceeds the threshold.

By employing the vegetation management system 50, customer trim requests made by a customer of the power distribution system (e.g., a user of the mobile device 56 or other instances of the mobile device 56) can be prioritized based on a plurality of conditions. In this manner, customer trim requests can be prioritized based on a predicted impact of the identified vegetation 60 relative to the identified industrial equipment 61. Additionally, the vegetation maintenance analyzer 66 can generate trim requests based on past patterns, thereby automating a portion of vegetation maintenance.

Figure 2:
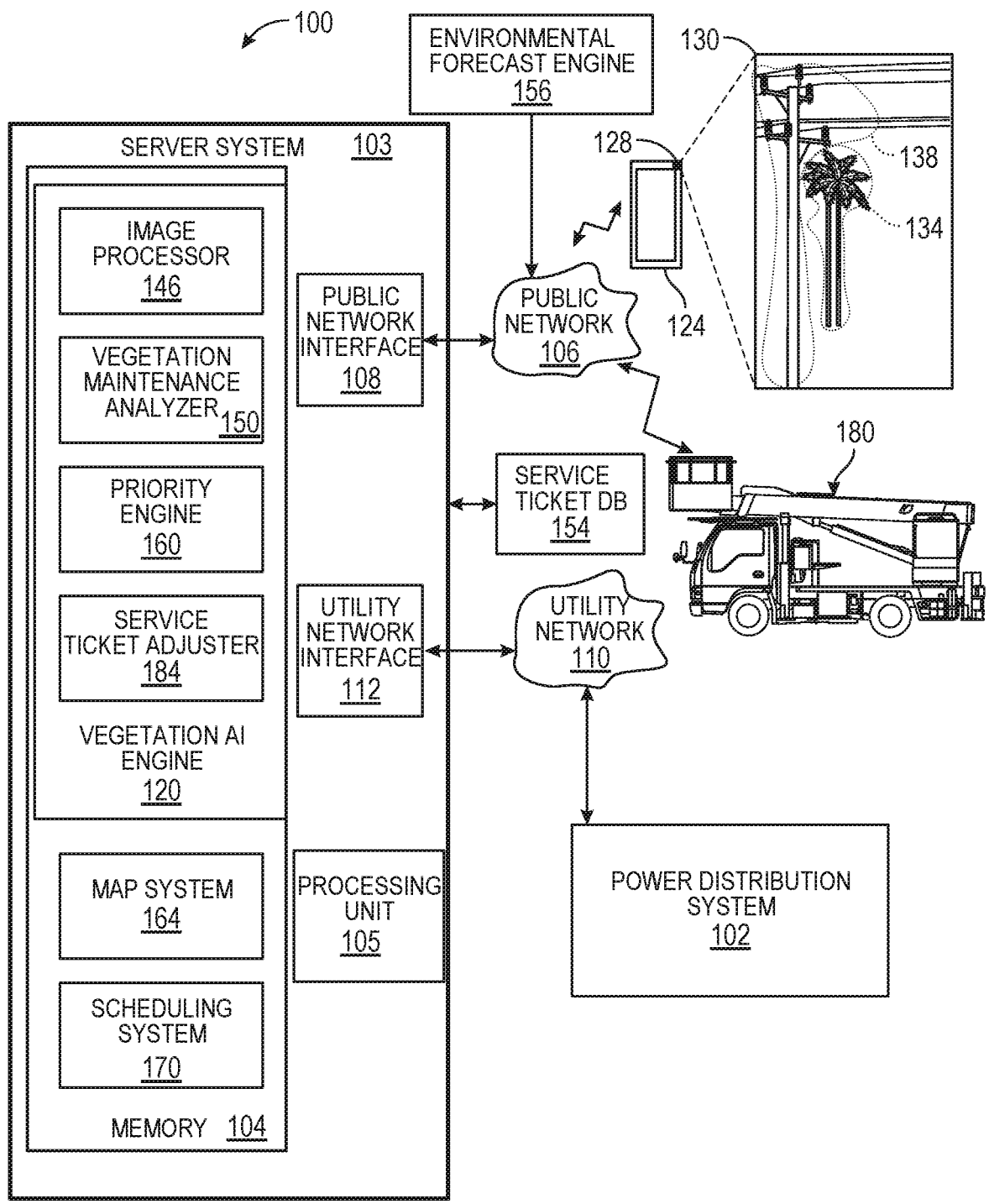
FIG. 2 illustrates a block diagram of another example of a vegetation management system for managing trim requests.

FIG. 2 illustrates a vegetation management system 100 that is employable to manage and/or generate trim requests for a power distribution system 102. The vegetation management system 100 can be employed to implement the vegetation management system 50 of FIG. 1. The power distribution system 102 can include, for example, industrial equipment that is employable to provide power to customer premises. The industrial equipment can include, for example, transmission lines, feeders, transformers, fuse cutouts, etc. for the power distribution system 102. The vegetation management system 100 includes a server system 103 that can be employed to implement the server system 54 of FIG. 1. The server system 103 can communicate on a public network 106 via a public network interface 108 and a utility network 110 via a utility network interface 112. The public network 106 can be implemented, for example as the Internet. The utility network 110 can be implemented as a private network, such as a network that communicates with devices (e.g., sensors, transformers, switches, etc.) mounted throughout the power distribution system 102.

The server system 103 can be implemented as a computing platform, such as one or more servers that execute application software on top of an operating system. That is, the server system 103 may be implemented as a combination of hardware (e.g., memory and one or more processors) and software. The server system 54 can be implemented as a utility server. The server system 103 can include a memory 104 that can store machine readable instructions. The memory 104 could be implemented, for example, as non-transitory computer readable media, such as volatile memory (e.g., random access memory), nonvolatile memory (e.g., a hard disk drive, a solid state drive, flash memory, etc.) or a combination thereof. The server system 103 can also include a processing unit 105 to access the memory and execute the machine-readable instructions. The processing unit 105 can include, for example, one or more processor cores. The server system 103 could be implemented in a computing cloud. In such a situation, features of the server system 103, such as the processing unit 105, and the memory 104 could be representative of a single instance of hardware or multiple instances of hardware with applications executing across the multiple of instances (i.e., distributed) of hardware (e.g., computers, routers, memory, processors, or a combination thereof). Alternatively, the server system 103 could be implemented on a single dedicated server.

The server system 103 can execute application software (e.g., apps) that are stored in the memory 104. More particularly, the server system 103 can include a vegetation AI engine 120 stored in the memory 104 that is programmed to manage and/or generate trim requests. In some examples, trim requests can be generated by customers (or other individuals) at or near customer premises that receive electrical power from the power distribution system 102. Such trim requests can be referred to as customer trim requests. In other examples, the vegetation AI engine 120 can generate the trim requests base on predicted needs.

In the present examples, the customer can generate a customer trim request using a remote computing device, such as a mobile computing device 124, such as a smart phone or a tablet computer. In some examples, the mobile computing device 124 can execute a specialized software application (e.g., an app) to facilitate generation of the trim request. In other examples, the mobile computing device 124 can access a web page to facilitate the generation of the trim request.

In either such situation, the customer can employ a camera 128 on the mobile computing device 124 to capture an image 130 of vegetation 134 that may interfere with industrial equipment 138 of the power distribution system 102. More particularly, in some examples, vegetation 134 (e.g., trees, bushes, vines, etc.) may either be contacting the industrial equipment 138 or be proximal to the industrial equipment 138. For example, the image 130 can depict a situation where if growth of vegetation 134 goes unchecked, the vegetation 134 will grow to a point where the vegetation 134 contacts and potentially interferes with the industrial equipment 138.

The customer can also employ the mobile computing device 124 to provide additional information about the customer trim request. The additional information can include, for example, identification of a species of the vegetation 134. The additional information can also include location information (e.g., a location pin) that can include a geolocation (e.g. implemented as a geotag) of the mobile computing device 124 and/or a location of a marker (e.g., a pin) selected by the customer. The mobile computing device 124 can aggregate the information to provide the customer trim request to the vegetation AI engine 120 via the public network 106.

The vegetation AI engine 120 can be implemented as a machine learning framework that employs multiple parallel processing layers to manage and generate the trim requests. The different layers can employ similar or different machine learning techniques, such as supervised, unsupervised machine learning techniques and/or reinforcement learning and any combination thereof (e.g., as a machine learning ensemble engine). More specifically, the layers of the vegetation AI engine 120 can implement clustering, dimensionality reduction, neural networks for classification, regression and any combination thereof.

An image processor 146 can be implemented on a layer of the vegetation AI engine 120. The image processor 146 can receive the customer trim request generated by the mobile computing device 124. The image processor 146 can be programmed/configured to extract metadata from the customer trim request. More particularly, the image processor 146 can include a trained model that is employable to classify features of the image 130 included with the customer trim request.

For instance, the image processor 146 can parse the image 130 and employ image recognition machine learning techniques (e.g., classification) to identify and mark the vegetation 134 and the industrial equipment 138. In such a situation, the image processor 146 can identify a boundary of the vegetation 134 and a boundary of the industrial equipment 138 that is proximal to the vegetation 134. In some examples, the image processor 146 can match the additional information included with the customer trim request to label the vegetation with information characterizing a species of the vegetation. In other examples, the image processor 146 can be programmed to identify the species of the vegetation using machine learning techniques (e.g., image classification). In the example illustrated in FIG. 2, the vegetation 134 can be categorized as a palm tree.

As noted, the image processor 146 can mark the industrial equipment 138 in the image 130. In some examples, the image processor 146 can employ machine learning techniques (e.g., image classification) to identify a type of the industrial equipment 138. In the example illustrated, the industrial equipment 138 of the image 130 can be categorized as transmission lines and a utility pole.

Furthermore, the image processor 146 can identify a location associated with the customer trim request. In some examples, metadata, such as a geotag can be embedded in the image 130 of the customer trim request. Additionally or alternatively, in some examples, the image processor 146 can extract location information regarding a user added location marker (e.g., a pin).

The image processor 146 can provide the customer trim request to another layer of the vegetation AI engine 120. More particularly, the image processor 146 can provide the customer trim request to a vegetation maintenance analyzer 150 of the vegetation AI engine 120. The vegetation maintenance analyzer 150 of the vegetation AI engine 120 can generate a maintenance profile for the customer trim request.

The vegetation maintenance analyzer 150 can access a service ticket database 154 that stores historical data characterizing past service tickets that have been executed (e.g., closed service tickets) and pending service tickets related to trim requests. That is, the service ticket database 154 includes historical data characterizing past service tickets executed in response to trim requests, as well as data of pending service tickets that are to be executed in the future. As used herein, the term "service ticket" indicates a past or pending work order for a service crew, such as a vegetation maintenance crew. In the context of vegetation management for the power distribution system 102, a service ticket refers to a past or pending work order to inspect and/or adjust (e.g., cut or trim) vegetation that may (or may not) be interfering with industrial equipment of the power distribution system 102.

Service tickets in the service ticket database 154 can include a location and information characterizing industrial equipment, as well as vegetation at the associated location. Additionally, service tickets include a timestamp that can be in the past (for previously executed service tickets) or in the future (for pending service tickets). Additional information, such as an identifier of a particular service crew that has or will be dispatched to inspect and/or remedy a situation at the corresponding location.

The vegetation maintenance analyzer 150 can search the service ticket database 154 for a proximal location match between the location identified in the customer trim request and a location in a service ticket. In the event that a match is made, an identifier of the service ticket can be included in the maintenance profile of the customer trim request. If no match is found, the maintenance profile for the customer trim request can indicate that no matches are found in the service ticket database 154. In some examples, a matched previously executed service ticket (e.g., historical data) can be employed to determine (or re-label) a species of the identified vegetation 134.

If a past service ticket is matched with the customer trim request, the maintenance analyzer 150 can examine the past service ticket that has been previously executed to extract information from the previously executed service ticket (e.g., type of work done, equipment needed), etc. to generate the maintenance profile for the customer trim request. In this manner, the maintenance profile can include information that can characterize the type of interference the identified vegetation 134 may be causing or may cause in the future.

Additionally, the vegetation maintenance analyzer 150 can predict a growth rate for the vegetation 134 identified in the image 130 included in the customer trim request. The growth rate can be based, for example on the identified species of the vegetation 134. The growth rate can also be based, for example on forecast data provided from an environmental forecast engine 156 via the public network 106. The forecast data can include, for example, weather data, seasonal forecast data and/or other environmental data associated with the location identified in the image 130 of the customer trim request. Further, the maintenance analyzer 150 can employ the growth rate to predict a date that the vegetation 134 will interfere with the industrial equipment 138, which can be referred to as a predicted interference date. Additionally or alternatively, the vegetation maintenance analyzer 150 can determine that the vegetation 134 is already interfering with the industrial equipment 138. The growth rate and/or the predicted interference date for the vegetation 134 can be added to the maintenance profile of the customer trim request.

The vegetation maintenance analyzer 150 can provide the customer trim request, along with the maintenance profile for the customer trim request to a priority engine 160 of the vegetation AI engine 120. The priority engine 160 can employ machine learning techniques to assign a priority to the customer trim request that is based on the information extracted by the image processor 146 and the maintenance profile for the customer trim request.

More particularly, the priority engine 160 can examine the type of the industrial equipment 138, the predicted growth rate and the predicted interference date along with the (if present) matched service ticket associated with the location corresponding to the customer trim request to assign the priority to the customer trim request. In the examples illustrated, the priority is set to a value between 0 and 5. However, in other examples, other ranges are employable. The assigned priority is based on a plurality of factors, some of which may be controlling. For example, if the identified industrial equipment 138 is particularly sensitive to vegetation interference (e.g., a transformer), the customer trim request can be assigned a higher priority than industrial equipment with low sensitivity to interference (e.g., a utility pole). Additionally, the growth rate of certain species of vegetation (e.g., palm trees, pine trees and bamboo) may be much greater than other species of vegetation (e.g., deciduous trees, such as oak trees). Thus, a customer trim request associated with a palm tree or bamboo may be assigned a higher priority than a customer trim request associated with an oak tree.

Figure 3A:
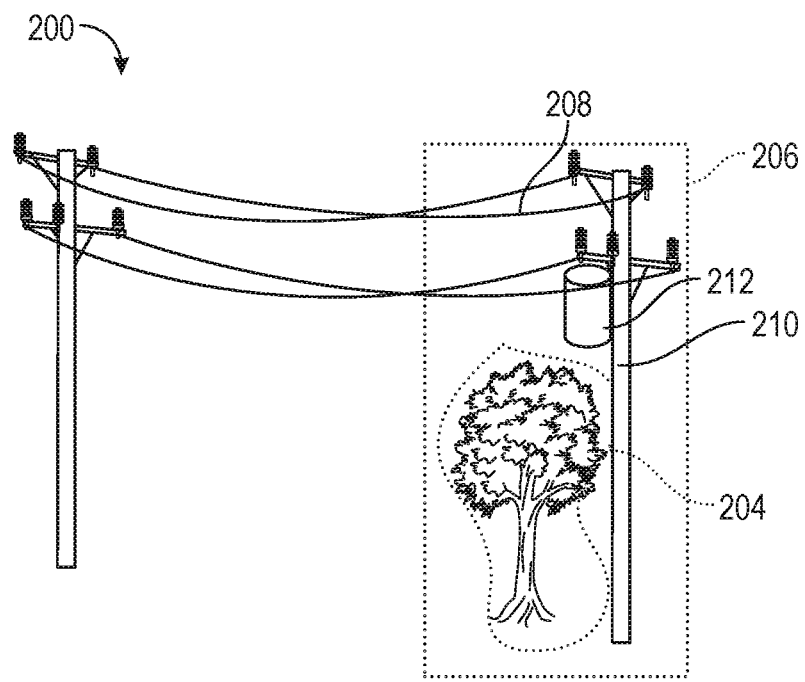
FIGS. 3A-3D illustrate examples of images captured for customer trim requests.

FIGS. 3A-3D illustrate simplified images that could be captured by the mobile computing device 124 and employed as different instances of the image 130 in the customer trim request. More particularly, FIG. 3A illustrates an image 200 wherein identified vegetation 204 could be representative of a walnut tree, and the identified industrial equipment 206 includes transmission lines 208, a utility pole 210 and a transformer 212. In such a situation, due to the proximity of the vegetation 204 and the transformer 212 (e.g., industrial equipment with a high sensitivity to interference), a customer trim request associated with the image 200 may be assigned a high priority (e.g., 5) by the priority engine 160 of FIG. 2.

Figure 3B:
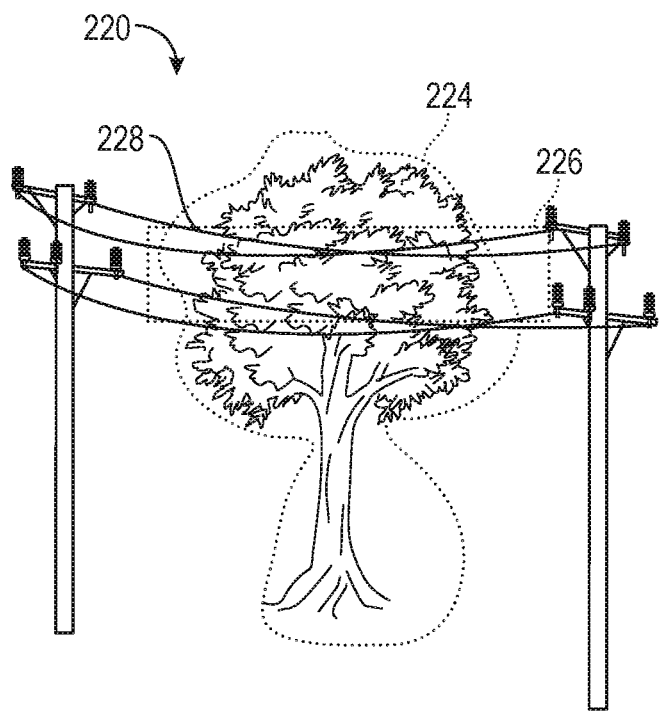

FIG. 3B illustrates an image 220 wherein identified vegetation 224 could be representative of an orange tree, and identified industrial equipment 226 could include transmission lines 228. In the image 220, it is presumed that the identified vegetation 224 is behind the transmission lines 228 and it appears that contact between the identified vegetation 224 and the identified industrial equipment 226 is not imminent, which would be indicated in an associated maintenance profile. Thus, a customer trim request associated with the image 220 could be assigned a low priority (e.g., 2) by the priority engine 160 of FIG. 2 due to the unlikeliness that the identified vegetation 224 could interfere with the identified industrial equipment 226.

Figure 3C:
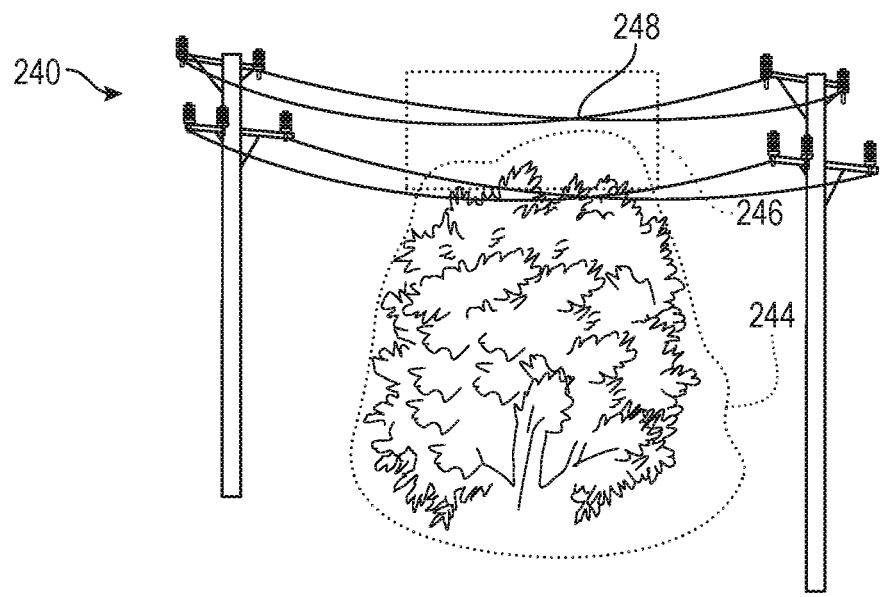

FIG. 3C illustrates an image 240 wherein identified vegetation 244 could represent a bush, and identified industrial equipment 246 could include transmission lines 248. In the image 240, it is presumed that the identified vegetation 244 will contact or is already contacting the transmission lines 248. However, it is also presumed that the transmission lines 248 have a low sensitivity to vegetation interference (e.g., such as with insulated transmission lines) and that the identified vegetation 244 is presumed to have a slow growth rate. Thus, a customer trim request associated with the image 240 could be assigned a medium priority (e.g., 3) by the priority engine 160 of FIG. 2 due to the lack of urgency in remedying the situation.

Figure 3D:
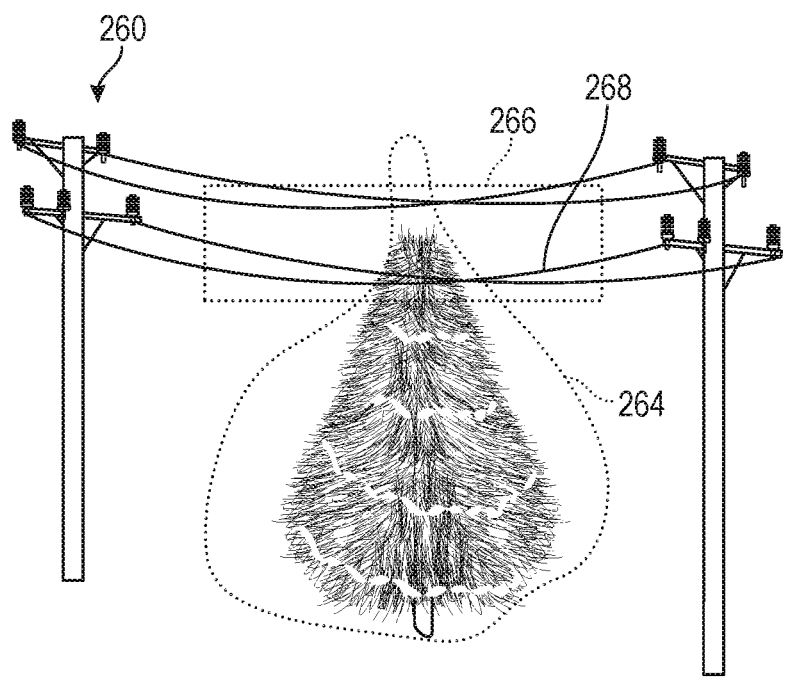

FIG. 3D illustrates an image 260, wherein identified vegetation 264 could represent a pine tree and identified industrial equipment 266 could include transmission lines 268. In the image 260, it is presumed that the identified vegetation 264 is already contacting the transmission lines 268, but that the transmission lines 268 have a low sensitivity to vegetation interference. However, the identified vegetation 264 is presumed to have a high growth rate. Thus, a customer trim request associated with the image 260 could be assigned a high priority (e.g., 4) by the priority engine 160 of FIG. 2.

Referring back to FIG. 2, the assigned priority could also be based on the forecast data included in the maintenance profile and or data retrieved from a map system 164 that includes geographical information related to equipment of the power distribution system 102. For instance, if the forecast data indicates that high winds (e.g., due to hurricane season) are expected in a particular direction that would increase the likelihood that the identified vegetation 134 would interfere with the identified industrial equipment 138, the priority engine 160 could assign a higher priority than would otherwise be assigned. Furthermore, in some situations, the identified industrial equipment associated with a customer trim request may not be part of the power distribution system 102. For instance, if the identified industrial equipment 138 is a cable television transmission line or a telephone wire, the customer trim request may be assigned a lowest priority (e.g., 0) indicating that the identified industrial equipment is outside the jurisdiction of the power distribution system 102.

Further still, the priority can be based on a report associated with a matched past executed service ticket. For example, if the past executed service ticket associated with a location proximal to the location identified in the customer trim request indicates that vegetation was severely interfering with industrial equipment, the priority engine 160 can assign a higher priority (e.g., 3-5) to the customer trim request. Conversely, if the past executed service ticket associated with a location proximal to the location identified in the customer trim request indicates that upon inspection vegetation was not interfering with industrial equipment (e.g., a false positive), the priority engine 160 can assign a lower priority (e.g., 1) to the customer trim request.

Moreover, the priority engine 160 can access the map system 164 to determine a proximity between and/or travel route between the matched service ticket and the customer trim request. If the matched service ticket is in close proximity to an already pending service ticket, the priority engine 160 can assign a higher priority to the customer trim request.

If the priority meets or exceeds a threshold level (e.g., a priority of 2 or greater), the priority engine 160 can provide the customer trim request, the assigned priority and the maintenance profile to a scheduling system 170 executing on the server system 103 along with the assigned priority and the maintenance profile. In response, the scheduling system 170 may or may not generate a service ticket for a service crew 180. For instance, in some situations, if a pending service ticket has already been created, the scheduling system 170 can provide the priority engine 160 with an expected date of execution of the pending service ticket. In other situations, the scheduling system 170 can generate the service ticket for the customer trim request, and provide an expected execution date for the customer trim request to the priority engine 160. In some examples, if the assigned priority does not meet the threshold, the priority engine 160, does not provide the customer trim request, the maintenance profile or the assigned priority to the scheduling system 170.

The priority engine 160 can provide a notification for the mobile computing device 124 that was employed to generate the customer trim request based on the assigned priority and the response from the scheduling system 170. The notification provided can be, for example, an email, a push notification or a short message service (SMS) message. In some examples, the notification can include information characterizing the assigned priority for the customer service request. The notification can include, for example, an expected date of execution of an associated service ticket. Alternatively, the notification can include information indicating that no service ticket will be generated, and reasons for not generating the service ticket. The reasons could include, for example, a low likelihood of interference or an indication that the industrial equipment is outside the jurisdiction of the power distribution system 102.

The scheduling system 170 generates the service tickets and dispatches the service crew 180 (which could represent multiple service crews) to inspect and/or remedy situations identified in trim requests. The service crew 180 can receive a service ticket, execute the service ticket and generate a report that is returned to the scheduling system 170 that can associate the report with the service ticket in the service ticket database 154. Additionally, the scheduling system 170 can provide the report to the vegetation AI engine 120 that can employ the report as feedback to adjust parameters in the layers of the machine learning platforms (e.g., the image processor 146, the vegetation maintenance analyzer 150 and the priority engine 160) to improve accuracy of predictions over time.

Additionally, in some examples, the vegetation maintenance analyzer 150 and the priority engine 160 can operate in concert to generate trim requests (e.g., non-customer generated trim requests). In particular, the vegetation maintenance analyzer 150 can access the service ticket database 154 and analyze past and pending service tickets to identify maintenance patterns. For instance, if the vegetation maintenance analyzer 150 identifies three service tickets issued for the same area over a 5 year time span, the maintenance analyzer 150 can generate a trim request and a maintenance profile for the trim request based on a predicted pattern. In another example, the vegetation maintenance analyzer 150 may identify a situation where a pattern of service tickets indicates that if a service ticket is pending for a given location, that a service ticket for another location should also be generated. For instance, if a trim request for a transmission line that runs through the given location is generated and that same transmission line runs through the other location, the vegetation maintenance analyzer 150 may generate a trim request for the other location.

The vegetation maintenance analyzer 150 can provide the trim request to the priority engine 160 that can assign priority to the trim request based on the generated maintenance profile and provide the trim request to the scheduling system 170 if the assigned priority meets or exceeds the threshold. In this situation, the priority engine 160 can also generate a notification (e.g., an email, a push notification or an SMS message) for a contact associated with the location corresponding to the generated trim request. The notification can include a date of a pending service ticket and/or a warning regarding the location corresponding to the generated trim request. The contact could be, for example a contact for a customer premises in proximity to the location corresponding to the trim request. Thus, in addition to handling customer trim request, the vegetation AI engine 120 can also generate the trim requests.

Figure 4:
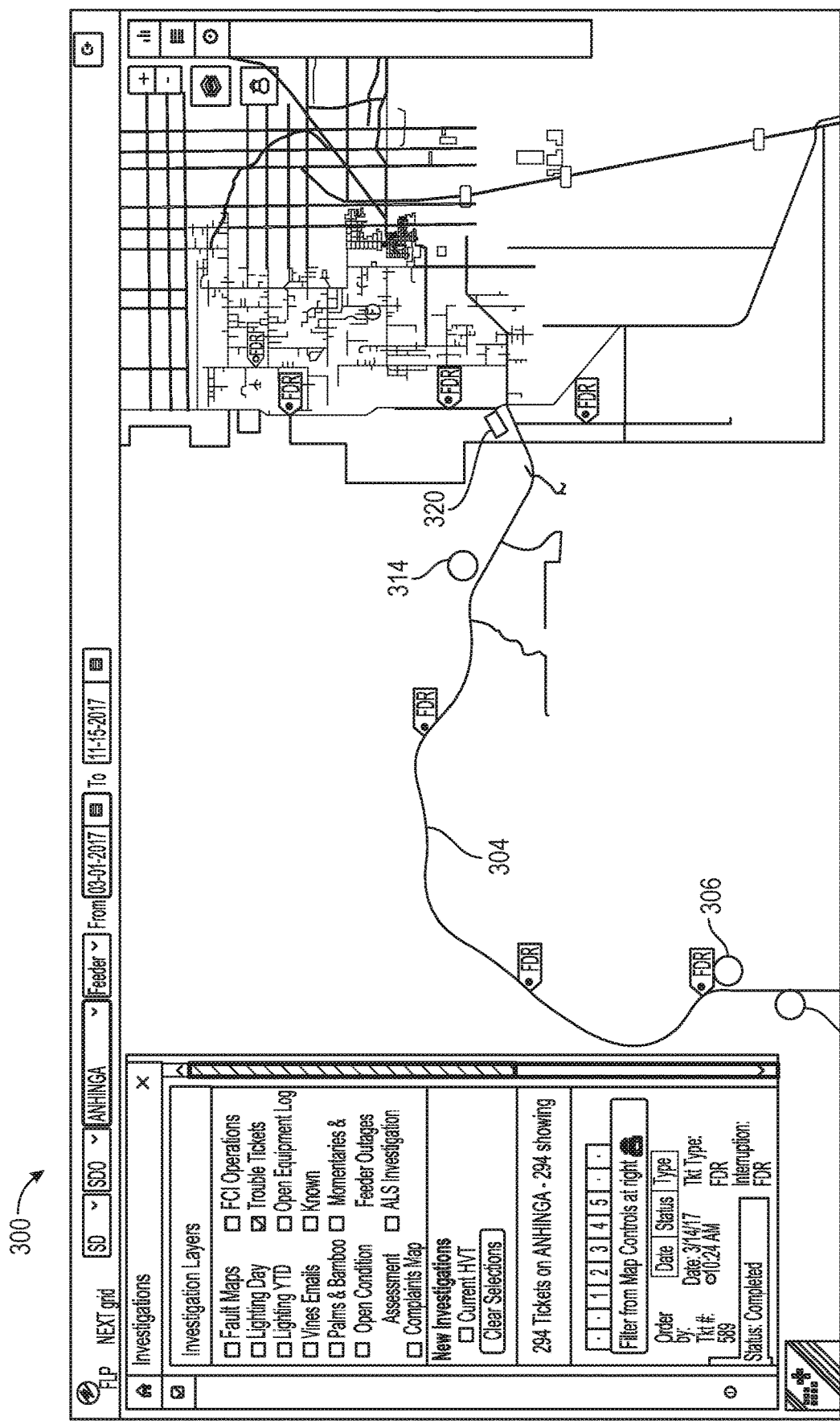
FIG. 4 illustrates an example of a map that includes markers corresponding to pending service tickets.

Furthermore, in some examples, the vegetation AI engine 120 can include a service ticket adjuster 184. The service ticket adjuster 184 can communicate with the scheduling system 170 to re-arrange an order of pending service tickets. More particularly, the service ticket adjuster 184 can evaluate map data from the map system 164 and the pending service tickets in the service ticket database 154 to identify service tickets with a close location proximity and/or a convenient route. For instance, if two tickets are in close proximity or along a same route, the service ticket adjuster 184 can adjust an execution date for one or both of the service tickets. FIG. 4 illustrates a map 300 that demonstrates this concept.

The map 300 includes a diagram depicting a feeder line 304 that extends along a road (hidden from view). The map 300 includes a first marker 306 associated with a first service ticket. That is, the first marker 306 identifies a location where a service crew (e.g., the service crew 180 of FIG. 2) would inspect and/or remedy a situation identified in a trim request. Similarly, the map includes a second marker 310 associated with a second service ticket and a third marker 314 associated with a third service ticket.

In the example demonstrated by the map 300, it is presumed that initially, the first service ticket, the second service ticket and the third service ticket are scheduled to be executed on different days. Moreover, in the present example, it is presumed that the service crew is deployed from a dispatch station 320. In this situation, the service ticket adjuster 184 of FIG. 2 can examine the relative locations and a predicted route for the service crew to execute the first service ticket, the second service ticket and the third service ticket.

In this example, the first ticket associated with the first marker 306 and the second ticket associated with the second marker 310 are in relatively close proximity (e.g., within 2 kilometers of each other). In this situation, the service ticket adjuster 184 of FIG. 2 may re-schedule the first and/or the second service ticket for the same day, even in situations where the first and second service tickets have different assigned priorities.

Similarly, in the map 300, the third service ticket is associated with the location at the third marker 314. Thus, in route to the location at the first marker 306 and/or the second marker 310 traveling from the dispatch station 320, the service crew would typically pass the location at the third marker 314. Accordingly, the service ticket adjuster 184 of FIG. 2 can communicate with the scheduling system 170 to re-schedule the first service ticket, the second service ticket and/or the third service ticket for the same day. In this manner, the service crew 180 of FIG. 2 can be efficiently dispatched.

Referring back to FIG. 2, by employing the server system 103, customer trim requests for vegetation can be analyzed and prioritized to ensure efficient deployment of the service crew 180. Moreover, as noted, over time, patterns in generated service tickets emerge. These patterns can be leveraged by the vegetation maintenance analyzer 150 of the vegetation AI engine 120 to anticipate a need for trimming vegetation. In these situations, the vegetation maintenance analyzer 150 can generate trim requests. Furthermore, the service ticket adjuster 184 can modify pending service tickets based on route information to further ensure efficiency in the deployment of the service crew 180.

Figure 5:
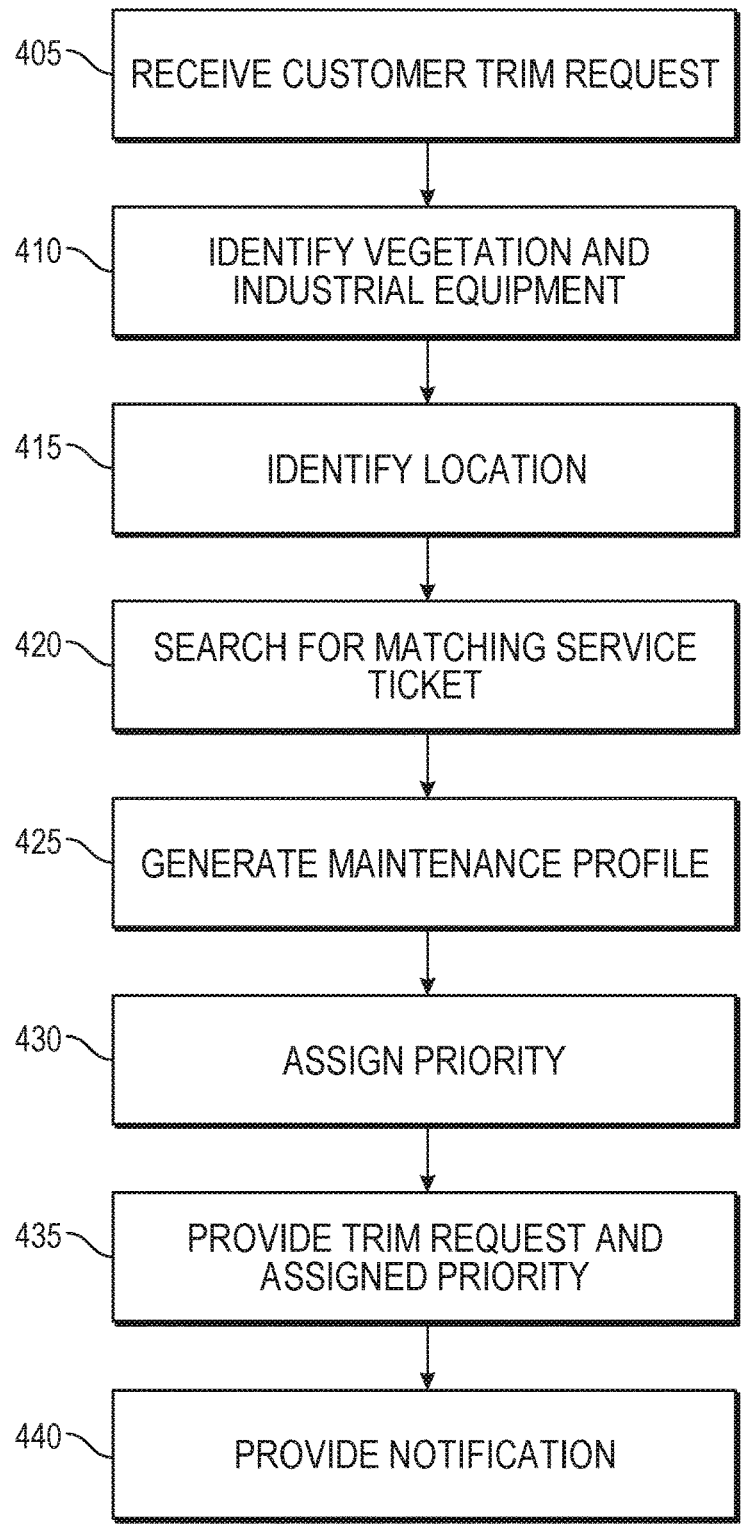
FIG. 5 illustrates a flowchart of an example method for managing a trim request.

In view of the foregoing structural and functional features described above, an example method will be better appreciated with reference to FIG. 5. While, for purposes of simplicity of explanation, the example method of FIG. 5 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 5 illustrates a flow diagram of an example method 400 for prioritizing trim requests related to a power distribution system. The method 400 can be implemented, for example, by the vegetation management system 50 of FIG. 1 and/or the vegetation management system 100 of FIG. 2. At 405, a vegetation AI engine (e.g., the vegetation AI engine 52 of FIG. 1) executing on one or more computing platforms (e.g., the server system 54 of FIG. 1), can receive a customer trim request from a mobile device (or other remote computing platform) that includes an image with vegetation and industrial equipment. At 410, the vegetation AI engine can identify and mark vegetation and industrial equipment contained in the image associated with the customer trim request. Identification of the vegetation can include identifying a species of the vegetation based on information included in the customer trim request and/or using image recognition techniques. Additionally, identification of the industrial equipment can include identifying a type of the industrial equipment (e.g., transmission lines, feeder lines, transformers, fuse cuts etc.). At 415, the vegetation AI engine can identify a location associated with the customer trim request. The location associated with the customer trim request can be based on metadata, such as a geotag embedded in the image associated with the customer trim request.

At 420, the vegetation AI engine can search for a match between the identified location associated with the customer trim request with a location associated with one of a past executed vegetation service ticket and a pending vegetation service ticket. At 425, the vegetation AI engine can generate a maintenance profile for the customer trim request based on the results of the search and data in the customer trim request. The maintenance profile can include, for example a predicted growth rate of the vegetation and a predicted interference date corresponding to a date when the identified vegetation will interfere with the identified industrial equipment. At 430, the vegetation AI engine can assign a priority to the customer trim request based on the maintenance profile for the customer trim request. At 435, the assigned priority, the maintenance profile and the customer trim request can be provided to a scheduling system that may or may not generate a service ticket for the customer trim request. Additionally, at 440, the vegetation AI engine can provide a notification to the mobile device characterizing the assigned priority as well as date assigned to the corresponding service ticket, if the service ticket is generated or pending.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system for prioritizing trim requests comprising:
an image processor, executing on one or more computing platforms that:
identifies a location associated with a customer trim request that includes an image of vegetation and industrial equipment; and
marks the vegetation and the industrial equipment visible in the image associated with the customer trim request, wherein the image processor is a machine learning model trained with historical data characterizing vegetation, industrial equipment, and location of past and pending service tickets to classify features of the image of the customer trim request, such that the vegetation is marked as a species and the industrial equipment is marked as a type;
a vegetation maintenance analyzer executing on the one or more computing platforms that:
searches for a match between the identified location associated with the customer trim request with a location associated with one of a past executed service ticket and a pending service ticket; and
generates a maintenance profile for the customer trim request based on the results of the search and data in the customer trim request that includes a prediction of growth rate for the species of vegetation identified in the image of the customer trim request under predicted environmental conditions corresponding to the location associated with the customer trim request; and a priority engine executing on the one or more computing platforms that:
assigns a priority to the customer trim request using machine learning and based on the species of vegetation and type of industrial equipment the image of the customer trim request and the maintenance profile for the customer trim request; and
provides the customer trim request and the assigned priority for the customer trim request to a scheduling service to schedule deployment of a service crew to execute a service ticket for the customer trim request in response to the priority assigned to the customer trim request meeting or exceeding a priority threshold level, wherein the scheduling service provides a report to the image processor and priority engine as feedback to update the historical data to train and adjust parameters of the machine learning model of the image processor.

2. The system of claim 1, wherein the priority engine generates a notification for the customer trim request characterizing the priority assigned to the customer trim request.

3. The system of claim 2, wherein the notification is one of a short message service (SMS) message, an email address and a push notification to a mobile device that provided the customer trim request.

4. The system of claim 1, wherein the vegetation maintenance analyzer analyzes service tickets related to the past executed trim service requests to generate a trim request for a particular geographical area, and generates a maintenance profile for the generated trim request.

5. The system of claim 4, wherein the priority engine assigns priority to the generated trim request based on the maintenance profile for the generated trim request and provides the generated trim request and the assigned priority for the generated trim request to the scheduling service to schedule deployment of a service crew to execute a service ticket for the generated trim request in response to the priority assigned to the customer trim request meeting or exceeding a priority threshold level.

6. The system of claim 5, wherein the priority engine generates a notification for a contact associated with a premises proximal to a location corresponding to the generated trim request indicating at least one of a warning and an execution date of a service ticket for the generated trim request.

7. The system of claim 1, wherein the vegetation AI engine further comprises a service ticket adjuster that re-arranges an order for a plurality of service tickets based on a priority of each of the plurality of service tickets and on a location proximity for each of the service tickets.

8. The system of claim 7, wherein a first service ticket with a first priority lower than a second service ticket is re-scheduled to execute on the same day as the second service ticket based on a geographical proximity between a location associated with the first service ticket and a location associated with the second service ticket.

9. The system of claim 1, wherein the customer trim request includes metadata characterizing a location within the image associated with the customer trim request and/or metadata characterizing a location where the image associated with the customer trim request was taken.

10. The system of claim 1, wherein the image processor identifies a type of the industrial equipment visible in the image associated with the customer trim request.

11. The system of claim 10, wherein the priority assigned to the customer trim request is based on the type of industrial equipment visible in the image associated with the customer trim request.

12. The system of claim 1, wherein the customer trim request is a first trim request associated with a first location, the image is a first image, the vegetation is a first vegetation, and the industrial equipment is a first industrial equipment, such that the image processor marks the first vegetation as a first species and marks the first industrial equipment as a first type; and
wherein the image processor identifies a second location associated with a second customer trim request that includes a second vegetation and second industrial equipment, such that the image processor marks the second vegetation as a second species and marks the second industrial equipment as a second type.

13. The system of claim 12, wherein the vegetation maintenance analyzer predicts a growth rate for the second vegetation that is greater than the growth rate of the first vegetation, such that the priority engine assigns a higher priority to the second customer trim request based on the growth rates of the first vegetation and second vegetation.

14. The system of claim 13, wherein the first type of industrial equipment has a higher sensitivity than the second type of industrial equipment, such that the priority engine assigns a higher priority to the first customer trim request based on the first and second type of industrial equipment, and growth rates of the first vegetation and second vegetation.

15. The system of claim 14, wherein the priority engine provides a third customer trim request associated with the second location, a third vegetation marked by the image processor as a third species, and the second industrial equipment, such that priority engine provides the third customer trim request to the scheduling service based on a pattern predicted by the vegetation maintenance analyzer in response to identifying a match between the locations of the past executed service ticket and the pending service ticket.

16. A system for prioritizing trim requests comprising:
an image processor, executing on one or more computing platforms that:
receives a customer trim request generated on a remote computing platform via a network, wherein the customer trim request includes an image containing vegetation and industrial equipment, and the image has an embedded geotag identifying a location;
marks the vegetation and the industrial equipment contained in the image associated with the customer trim request, wherein the image processor is a machine learning model trained with historical data characterizing vegetation, industrial equipment, and location of past and pending service tickets to classify features of the image of the customer trim request, such that the vegetation is marked as a species and the industrial equipment is marked as a type; and
receives a report as feedback to update the historical data to train and adjust parameters of the machine learning model;
a vegetation maintenance analyzer executing on the one or more computing platforms that:
searches for a match between the location embedded in the image associated with the customer trim request with a location associated with one of a past executed service ticket and a pending service ticket;

generates a maintenance profile for the customer trim request based on the results of the search and data in the customer trim request that includes a prediction of growth rate for the species of vegetation identified in the image of the customer trim request under predicted environmental conditions corresponding to the location associated with the customer trim request; and receive the report as feedback to update the historical data to train and adjust parameters of the machine learning model;

a priority engine executing on the one or more computing platforms that:

assigns priority to the customer trim request using machine learning and based on the species of vegetation and type of industrial equipment of the image of the customer trim request and the maintenance profile for the customer trim request; and provides a notification to the remote computing platform based on the assigned priority of the customer trim request.

17. The system of claim 16, wherein the priority engine provides the customer trim request and the assigned priority for the customer trim request to a scheduling service to schedule deployment of a service crew to execute a service ticket for the customer trim request in response to the priority assigned to the customer trim request meeting or exceeding a priority threshold level.

18. A method for prioritizing trim requests, the method comprising:

marking, by a vegetation artificial intelligence (AI) engine executing on one or more computing platforms, vegetation and industrial equipment contained in an image associated with a customer trim request generated by a remote computing platform, wherein the vegetation AI includes a machine learning model trained with historical data that includes vegetation, industrial equipment, and location to classify features of the image customer trim request, such that the vegetation is marked as a species and the industrial equipment is marked as a type;

identifying, by the vegetation AI engine, a location associated with the customer trim request;

searching, by the vegetation AI engine, for a match between the identified location associated with the customer trim request with a location associated with one of a past executed service ticket and a pending service ticket;

generating, by the vegetation AI engine, a maintenance profile for the customer trim request based on the results of the search and data in the customer trim request that includes a prediction of growth rate for the species of vegetation identified in the image of the customer trim request under predicted environmental conditions corresponding to the location associated with the customer trim request;

assigning, by the vegetation AI engine, a priority to the customer trim request using the machine learning model and based on the species of vegetation and type of industrial equipment of the image of the customer trim request and the maintenance profile for the customer trim request;

providing, by the vegetation AI engine, a notification to the remote computing platform based on the assigned priority of the customer trim request; and receiving, by the vegetation AI engine, a report as feedback to update the historical data to train and adjust parameters of the machine learning model.

19. The method of claim 18, further comprising:

generating, by a scheduling system executing on the one or more computing platforms, a service ticket for deployment of the service crew to the location identified in the customer trim request.

* * * * *